INVENTORS R. D. DEMING
D. A. JAMES
BY Donald M Duft
ATTORNEY

INTERTOLL SWITCH TRAIN

INVENTORS R. D. DEMING
D. A. JAMES
BY Donald M Duft
ATTORNEY

Dec. 1, 1964 R. D. DEMING ETAL 3,159,721

OUTGOING TRUNK IDENTIFICATION CIRCUIT

Filed July 13, 1960 9 Sheets-Sheet 3

OUTGOING TRUNK CIRCUIT

INVENTORS R. D. DEMING
D. A. JAMES
BY Donald M Swift
ATTORNEY

OUTGOING TRUNK IDENTIFICATION CIRCUIT

Filed July 13, 1960 9 Sheets-Sheet 4

INVENTORS R. D. DEMING
D. A. JAMES
BY Donald M Duft
ATTORNEY

OUTGOING TRUNK IDENTIFICATION CIRCUIT

Filed July 13, 1960 9 Sheets-Sheet 5

INVENTORS R. D. DEMING
D. A. JAMES
BY Donald M Duft
ATTORNEY

OUTGOING TRUNK IDENTIFICATION CIRCUIT

Filed July 13, 1960 9 Sheets-Sheet 6

INVENTORS R. D. DEMING
D. A. JAMES
BY Donald M Duft
ATTORNEY

OUTGOING TRUNK IDENTIFICATION CIRCUIT

Filed July 13, 1960 9 Sheets-Sheet 7

INVENTORS R. D. DEMING
D. A. JAMES
BY Donald M Duft
ATTORNEY

OUTGOING TRUNK IDENTIFICATION CIRCUIT

INVENTORS R. D. DEMING
D. A. JAMES
BY Donald M Duft
ATTORNEY

OUTGOING TRUNK IDENTIFICATION CIRCUIT

Filed July 13, 1960 9 Sheets-Sheet 9

INVENTORS R. D. DEMING
D. A. JAMES
BY Donald M Duft
ATTORNEY 3,159,721

OUTGOING TRUNK IDENTIFICATION CIRCUIT

Royce D. Deming, Hollis, N.Y., and Donald A. James, Dover, N.J., assignors to Bell Telephone Laboratories, Incorporated, New York, N.Y., a corporation of New York Filed July 13, 1960, Ser. No. 42,684
13 Claims. (Cl. 179—175.2)

This invention relates to a telephone system and more particularly to a telephone switching system wherein provision is made for facilitating the localization and identification of equipment trouble conditions. Still more particularly, this invention relates to a telephone switching system wherein provision is made for automatically recording the identity of a defective outgoing trunk upon the unsuccessful completion of a call directed to the defective trunk.

In direct controlled switching systems, such as step-by-step, trouble conditions resulting in unsuccessfully completed calls, although undesirable, may be corrected in a straightforward manner since the entire connection may be held operated while the trouble is localized and repaired. This procedure is satisfactory for such systems since the call serving capacity of the system is degraded only an insignificant amount while the remainder of the system is completely unaffected by the permanent busying of the troubled connection.

The situation is different in common controlled switching systems. In these, each call is served by certain equipment which is not individual to the connection but instead, is common to a substantial percentage of all lines or trunks in the office. Thus, the permanent busying of the equipment utilized in the serving of a call which could not be completed due to a trouble condition is most undesirable since the operation of the office would be appreciably degraded. For example, if a given crossbar office has ten senders, the permanent busying of one sender for the trouble shooting of a defective connection would reduce the call capacity of the office by a factor of 10 percent. As a result, telephone companies prefer to utilize other methods of locating troubles in such switching systems and leave to a last resort the practice of holding busy all equipment utilized in the serving of a troubled call.

Concomitant with the advent of common controlled switching systems, telephone engineers sought to provide improved facilities for locating circuit troubles. This effort has resulted in the availability of various sophisticated testing equipments. The manner in which some of these equipments have been successful in achieving their intended purpose may best be discussed in connection with a representative common controlled switching system of the prior art.

Patent 2,868,884, granted on January 13, 1959, to J. W. Gooderham et al., discloses a crossbar type toll switching system. In this system, calls are set up under the control of senders, which are connected with incoming trunks and which receive the designation of the called subscriber over such trunks. The sender, after receiving this information, proceeds to serve the call by establishing a connection between the calling incoming trunk and an outgoing trunk leading to the called office. Once this connection is completed, the sender outpulses all, or a part, of the received called subscriber designation over the outgoing trunk.

Whenever the sender fails to complete a requested connection, it causes the incoming trunk to be connected to a special signaling trunk which transmits a signal back over the incoming trunk to inform the calling subscriber or operator that the call cannot be completed and should be abandoned. The sender releases once the incoming trunk has been connected to the signaling trunk.

Each use of a signaling trunk is registered by automatic recording equipment and an unusually high rate of use for such trunks is a matter of concern. As shown in the above-identified Gooderham et al. patent, manually controlled means is provided for preventing the release of a sender after it is determined that an incoming trunk should be connected to a signaling trunk. This enables a maintenance attendant to determine the designation recorded in the sender and to trace manually the connection from the sender to the incoming trunk.

Patent 2,820,099, granted January 14, 1958, to J. W. Gorgas et al., provides improved trouble detection facilities over those shown in the Gooderham et al. patent. Specifically, the Gorgas et al. patent provides means for automatically producing a permanent record identifying certain of the equipments involved in the serving of an unsuccessfully completed call, as well as a record of the called subscriber number registered in the sender at that time. After the record is made, the connection of the incoming trunk to a signaling trunk is set up and the recording equipment is released. With this arrangement it is comparatively easy to determine the cause of many troubles in the sender or in the incoming end of the connection.

Although the Gorgas et al. invention comprises a significant advancement in the art, it still leaves room for improvement since it does not provide for the recording of circuit troubles in the outgoing trunk portion of the office. At the present time, these troubles are not easily identified and corrected. Although the sender has the called office code registered therein, it has no information pertaining to the identity of the outgoing trunk with which it is connected on any call. Therefore, if the trouble record, made in accordance with the above-identified Gorgas et al. patent, indicates that the cause of the trouble lies in the outgoing end of the connection, the sender must still be held and the connection traced manually in order to identify the cause of the trouble. This is a burdensome and time-consuming operation during which the sender must be blocked operated and held out of service. Also, it is not practicable to hold the sender out of service for the necessary time required during busy periods of the office since this might result in undesirable delays for many calls incoming to the office during such busy periods. The holding of stuck senders is also undesirable in that such action also holds the connected incoming trunk which, although out of service, may still be seized by incoming calls that ultimately would have to be abandoned. As a result, outgoing trunk troubles occurring during such busy periods are often disregarded. This, of course, is an undesirable practice since it does not promote maximum maintenance and efficiency of the equipment.

Accordingly, it is an object of the invention to facilitate the localization of circuit troubles in the outgoing trunk portion of a switching system.

It is a further object of the invention to facilitate the localization of outgoing trunk troubles by providing a means whereby a permanent record is made of each outgoing trunk trouble with the designation of the defective trunk being clearly shown on the record.

In accordance with the present invention, means is provided for identifying a defective outgoing trunk associated with a sender by having the sender call in a trouble recorder after having first ascertained that the call cannot be served because of a trouble condition. This means comprises the connection of a matrix identification circuit to the outgoing trunks whereby each outgoing trunk is individually connected to a different crosspoint of the matrix. The sender is also modified in such a manner that whenever a call is blocked due to a trouble in the outgoing trunk portion of the office, the sender simplexes its connection with the incoming trunk and applies a special test signal over this simplexed connection. This signal is transmitted over the intra-office switch train to the outgoing trunk serving the call. From there the signal passes through the matrix crosspoint connected to the outgoing trunk and to a trouble recorder which, by this time, has been called in by the sender. Since each crosspoint is representative of a different outgoing trunk, the trouble recorder ascertains which crosspoint is supplying the special test signal and makes a permanent record signifying the outgoing trunk serving the call. This record also indicates all the equipment involved in the unsuccessful completion of the call and therefore, maintenance personnel may analyze the connection and repair the trouble at their convenience rather than being forced to block operated the equipment associated with the call immediately upon detection of the trouble while the connection to the outgoing trunk is manually traced.

Records produced in accordance with the present invention have perforated thereon information identifying both the incoming and the outgoing trunk involved with a troubled call. Since only a limited number of paths through the office linkage are capable of interconnecting these two trunks, the trunk identity information also may be said to facilitate the location of linkage troubles which are undetected by the marker.

A feature of the invention is the provision of an outgoing trunk identification circuit which cooperates with the sender to manifest the identity of the outgoing trunk serving a call which could not be completed because of a trouble condition.

A further feature of the invention is the provision of means whereby the sender transmits a test signal of a non-interfering character over a pair of trunk conductors in simplex which are otherwise used for signaling between the sender and the outgoing trunk.

A further feature of the invention lies in the provision of a trunk identification circuit comprising a rectangular matrix having a crosspoint individual to each trunk. Each crosspoint includes a pair of diodes, the inputs of which are connected together to the trunk and the outputs of which are connected individually to multiples extending to identification relays which operate in response to the signal from the trunk.

An additional feature of the invention lies in means in the trouble recorder by which trunk identifying circuits, normally associated with a marker are transferred to the trunk identification circuit when the trouble recorder is seized because of a stuck sender.

These and other features of the invention will be more clearly understood from a consideration of the following description read in connection with the attached drawing in which.

*General Description*

While numerical designations are used in the present disclosure, the functional letter designations such as used in the above-identified Gooderham et al. and Gorgas et al. patents have also been shown for convenience in referring to those patents.

Figure 9:
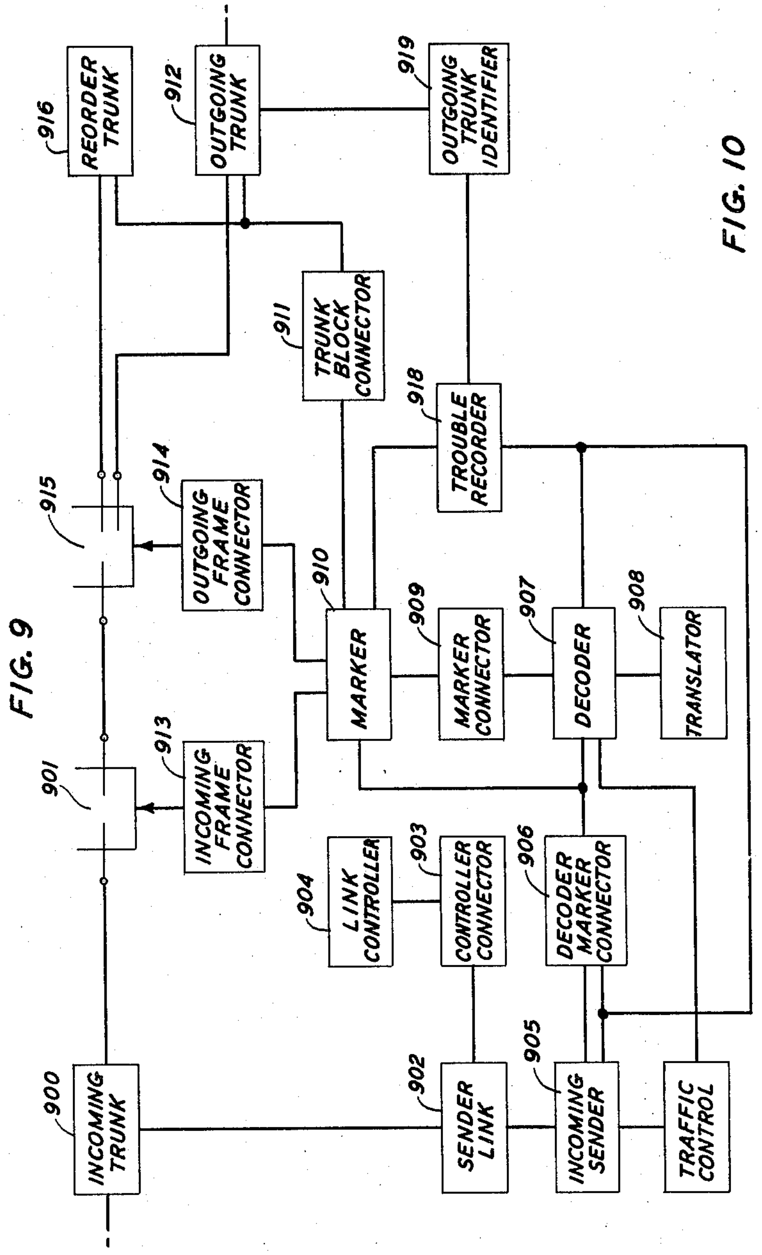
FIG. 9 is a diagrammatic showing of the equipment at a toll switching point in which the present invention may be employed.
Figure 10:
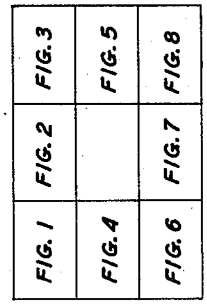
FIG. 10 shows the manner in which FIGS. 1 to 8 should be arranged.

Referring first to FIG. 9, a brief description will be given of the operation of the toll control switching arrangement disclosed in the above-identified Gooderham et al. patent to which reference is made for a complete description of the operation of the system and also for a showing of the complete circuits, only parts of which are included in the present disclosure.

In this telephone system, a large number of trunks, such as trunk 900, appear in the crossbar switches of incoming switch frames, such as frame 901, and also in the crossbar switches of sender links, such as sender link 902. When a call is directed to trunk 900, the operation of sender link 902 is initiated which, in turn, operates controller connector 903 to connect an idle link controller 904 with the sender link 902. The link controller 904 tests for and selects an idle incoming sender, such as sender 905, and operates the sender link switches to connect the incoming trunk 900 with the sender 905, after which the controller connector 903 and link controller 904 are released.

The called subscriber number is then transmitted over the incoming trunk 900, through the sender link 902, into the sender 905. This designation normally comprises a three-digit area code, a three-digit office code and a four-digit line number, although various other types of designations may also be used. When three digits have been registered, the sender operates the decoder marker connector 906 to select an idle decoder, such as decoder 907, and connects the selected decoder with the sender. The decoder immediately connects itself with its home translator 908 and the sender transfers the first three digits through the decoder to the translator. The translator may or may not be able to determine the necessary routing of the call from the three digits supplied. If additional digits are required, the decoder may be released and the same or another decoder is subsequently seized when sufficient digits have been registered. On this second seizure the same or a different translator may be used to complete the translation. When the translator has made its translation, the decoder operates marker connector 909 to select an idle marker, such as marker 910, and connects it with the decoder, after which the decoder marker connector 906 is further operated to connect the marker 910 with the sender 905. The necessary information is transmitted to the marker 910 to cause it to operate a trunk block connector, such as connector 911, to connect the marker with the desired group of outgoing trunks, after which the marker selects an idle outgoing trunk, such as trunk 912 and transmits a signal to the decoder and incoming sender to indicate that the trunk has been selected, whereupon the marker connector 909, decoder 907 and translator 908 are released. Under certain conditions the decoder and translator may be released before the marker has selected an idle trunk. Marker 910 then operates the incoming frame connector 913 and the outgoing frame connector 914 and operates the incoming frame switches 901 and the outgoing frame switches 915 to set up a connection between the incoming trunk 900 and the outgoing trunk 912. After this connection has been set up and tested, the marker 910 transmits a release signal to the incoming sender 905 and the decoder marker connector 906 is released, in turn releasing the marker 910, frame connectors 913 and 914, and trunk block connector 911.

Following the release of the marker, the sender awaits an indication that the distant office is ready to receive the called subscriber designation and all or a part of the registered designation, as determined by the translator, is transmitted over the connection to the distant office, after which the talking path through the incoming trunk 900 is established and the sender link 902 and the incoming sender 905 are released.

In addition to the outgoing trunks, such as trunk 912, the toll office is provided with a number of trunks which provide characteristic signals for transmission to the originating office. Such trunks include reorder trunks, such as trunk 916, which provide a tone and flashing signal, as well as trunks providing other signals, not indicated. If the marker cannot find an idle trunk or, having selected an idle trunk, cannot find an idle channel through the switches, it is arranged to automatically set up a connection to a reorder trunk, such as trunk 916.

Incoming senders, such as sender 905, are equipped with timing means which is effective, if the sender does not complete its serving of the call and release before a predetermined time elapses, to transmit a signal to the decoder that a trouble record should be made. In response to this signal, the decoder does not call in the translator, but proceeds to operate the marker connector to connect it with a marker, and also indicates to the marker that a trouble record is required. The marker and decoder are then connected with the trouble recording equipment indicated as trouble recorder 918. When the trouble recorder has been connected with the decoder and the marker, it is also connected with the incoming sender and the information stored in the sender is recorded by punching a card. The trouble recorder is also used to record troubles in the marker or the decoder, under which conditions it records information stored in the decoder or marker.

When the touble recorder is used to record sender troubles it causes the sender to transmit a signal to the outgoing trunk to operate the outgoing trunk identifier 919, which transmits the identity of the outgoing trunk to the trouble recorder where it is recorded as a part of the sender trouble record.

*Detailed Description*

Figure 1:
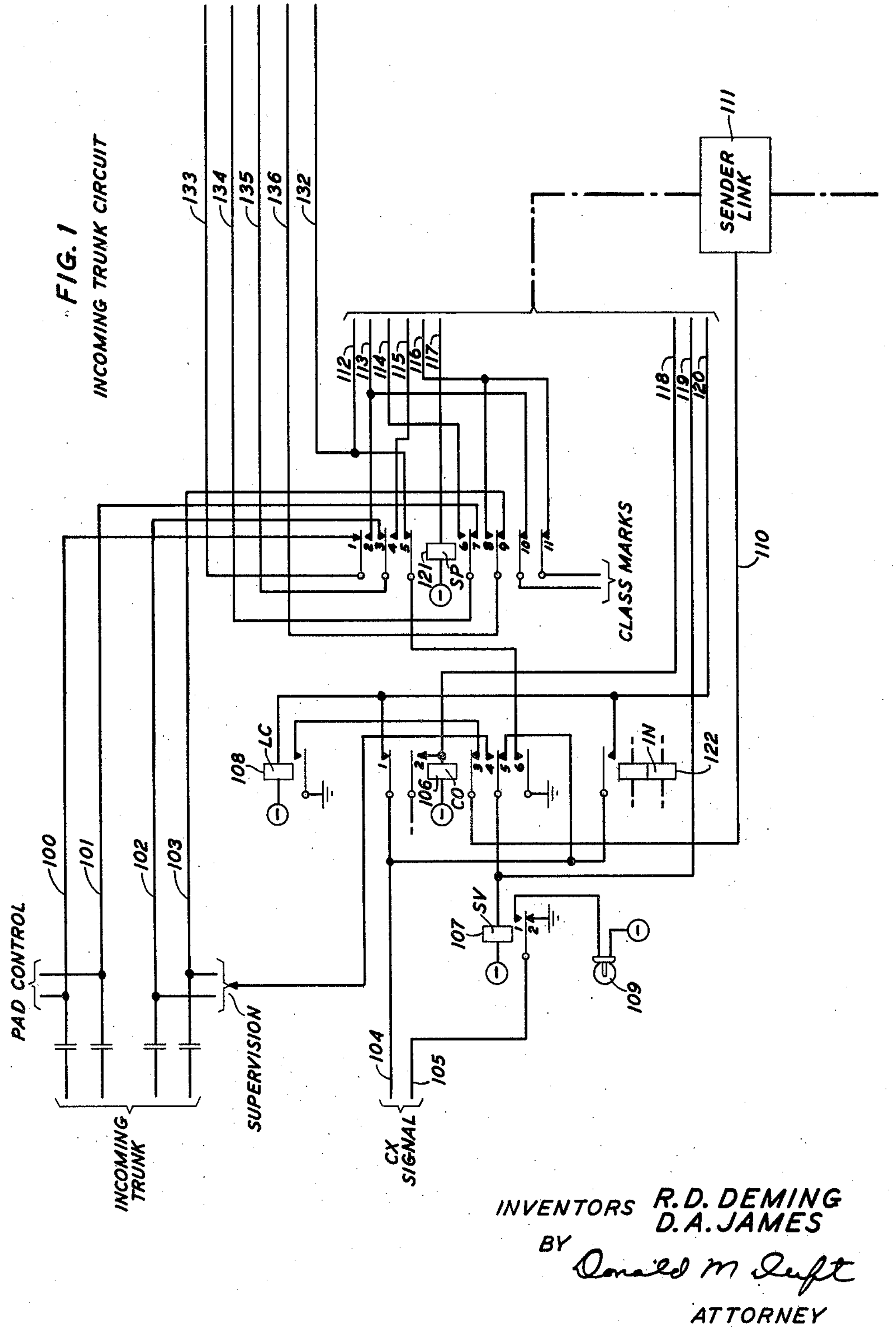
FIG. 1 shows an incoming trunk circuit and sender link.
Figure 2:
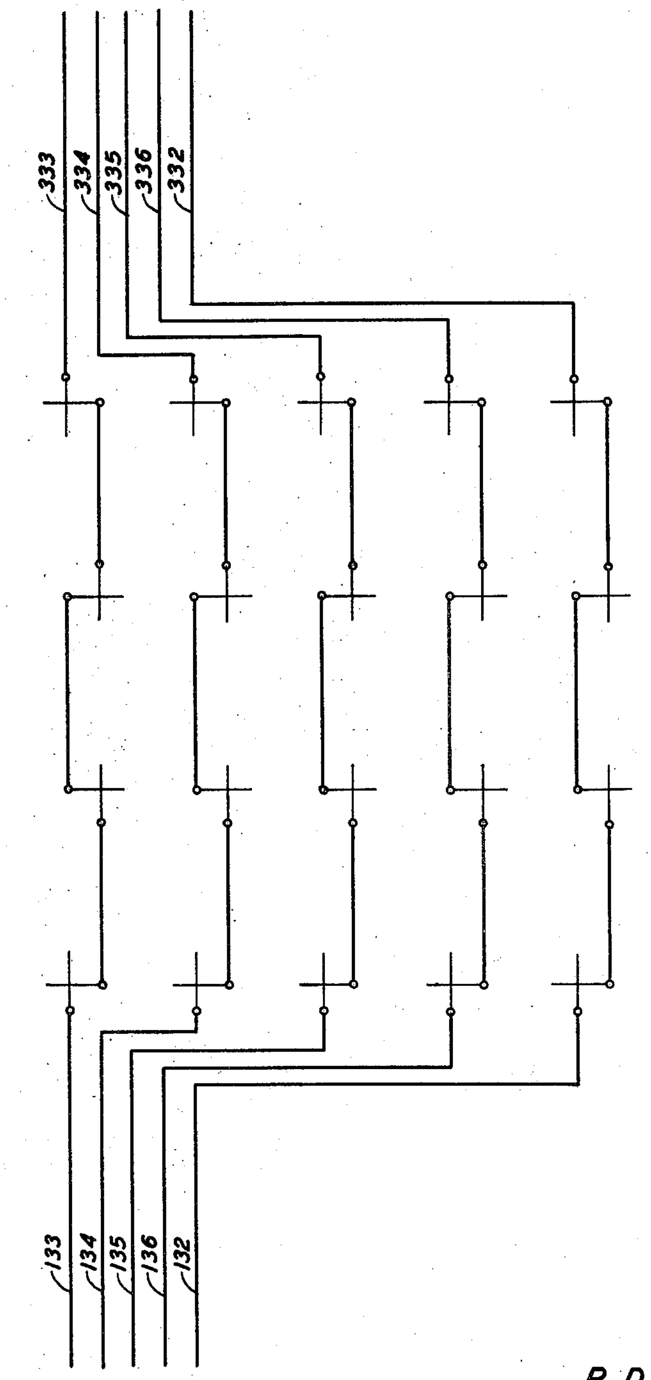
FIG. 2 shows the switches of an intertoll switch train.

Referring now to FIGS. 1 to 8, inclusive, an incoming call appears in an incoming trunk circuit such as shown in FIG. 1, with the talking circuit extending through condensers to conductors 100 to 103, while conductors 104 and 105 extend to a composite signaling circuit of well-known type. When the trunk circuit of FIG. 1 is seized, ground is connected to conductor 104, thereby completing a circuit over contact 5 of relay 106 to battery through the winding of relay 107. A parallel circuit is completed from ground on conductor 104, over contact 1 of relay 106 to battery through the winding of relay 108. Relays 107 and 108 operate in these circuits.

Relay 107 at its contact 2 disconnects ground from conductor 105 and at its contact 1 extends conductor 105 to battery through resistance lamp 109 as a signal to the calling office that the toll office is not ready to receive pulses.

As described in the above-mentioned Gooderham et al. patent, relay 108 operates relay 122 which locks throughout the duration of the call in preparation for a timed release. With relay 122 operated, conductor 104 is extended to conductor 120, independent of relay 106.

Figure 4:
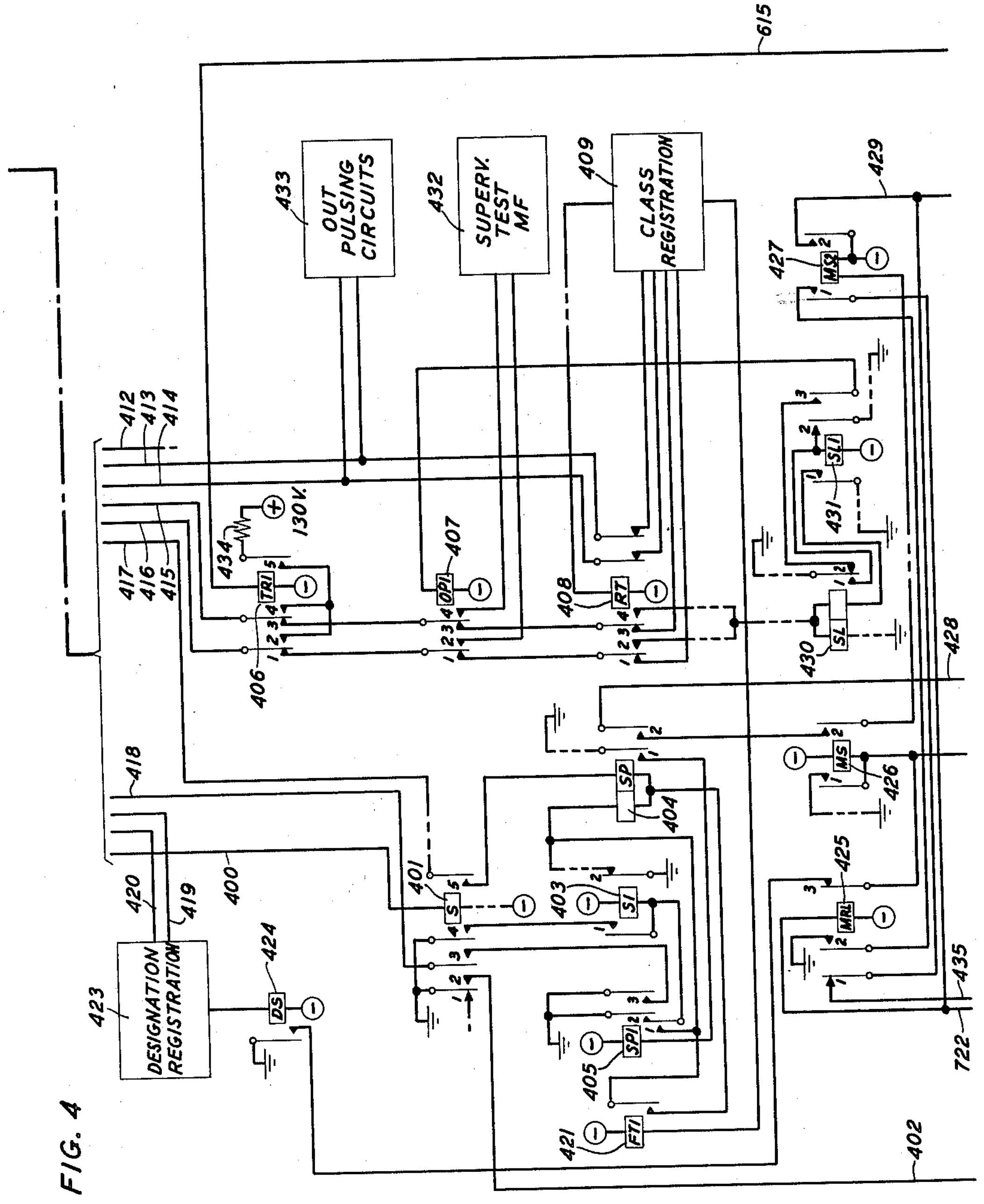
FIG. 4 shows a part of an incoming toll sender.
Figure 5:
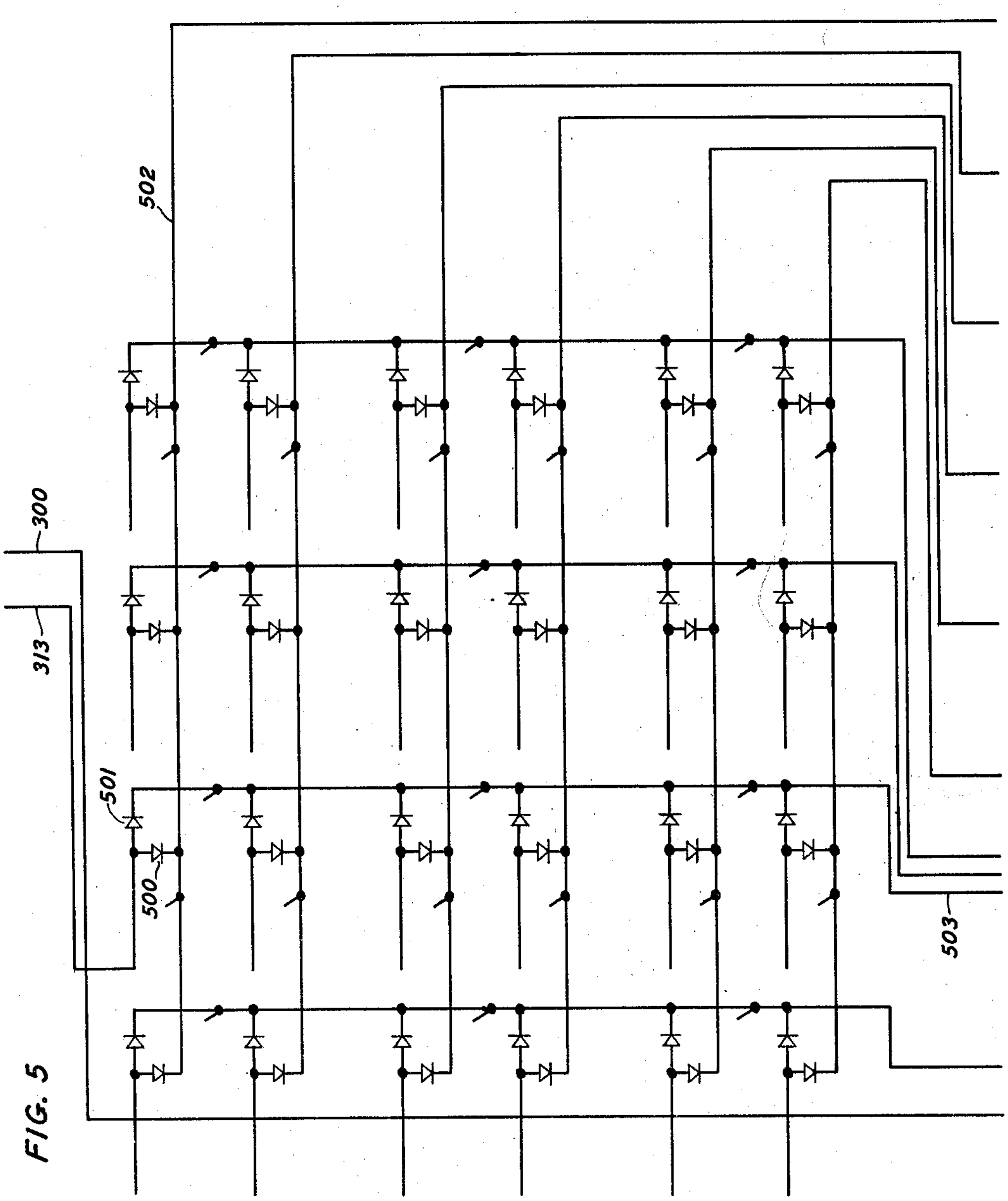
FIG. 5 shows a matrix for connection with all outgoing trunks.
Figure 6:
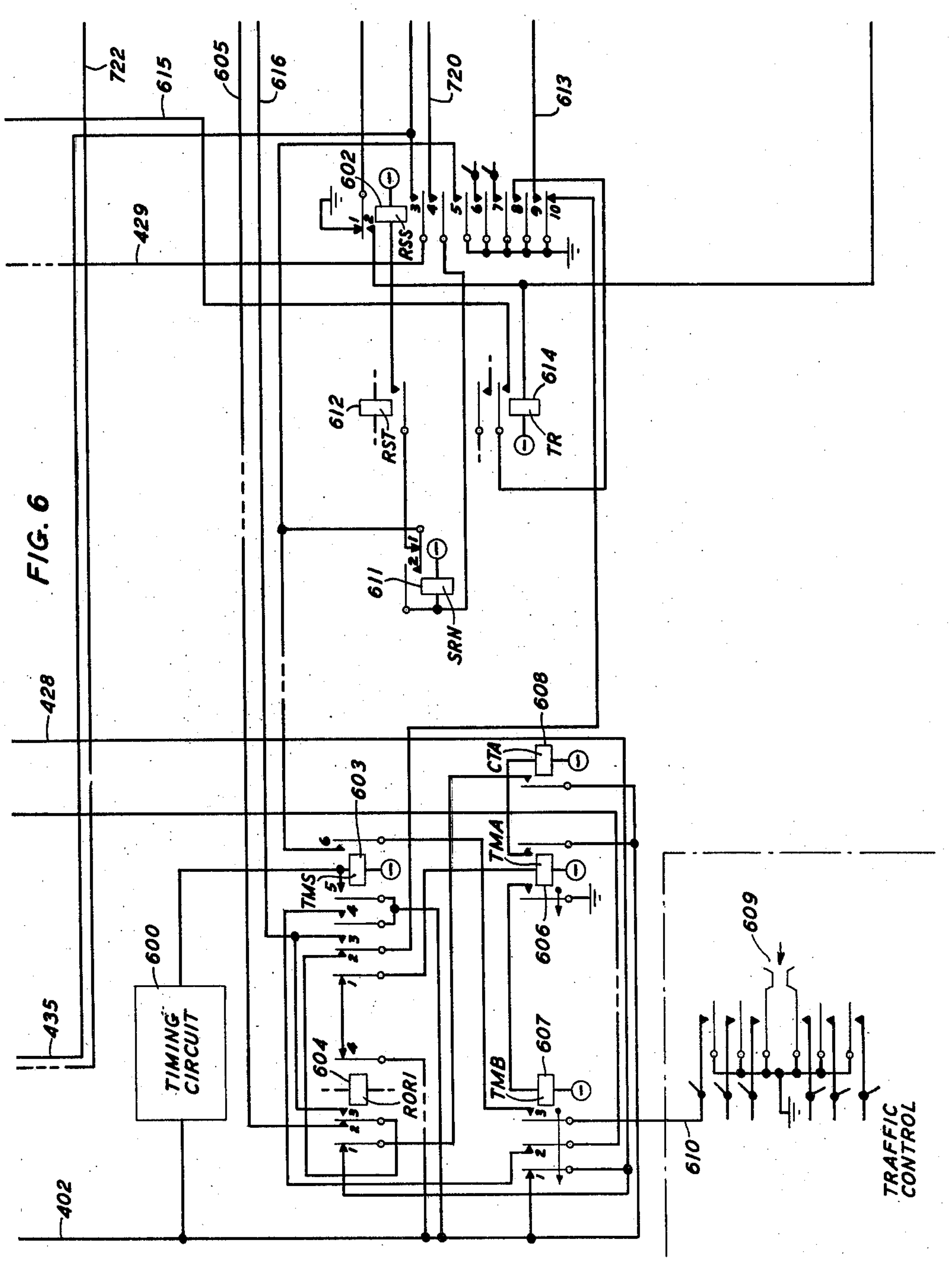
FIG. 6 shows an additional part of the incoming toll sender.

Relay 108 also connects ground over contact 3 of relay 106 to conductor 110, which is the start conductor for the sender link 111, thereby causing the sender link 111 to operate to connect the trunk circuit of FIG. 1 with an idle sender, such as shown in FIGS. 4 and 6. With the sender link 111 operated, trunk conductors 112 to 120 are connected to sender conductors 412 and 420, respectively. The sender link also connects ground to conductor 400, completing a circuit through the winding of relay 401 to battery, operating relay 401.

Relay 401, in operating, marks the sender busy and connects ground over its contact 2 and conductor 402 to the timing circuit 600 to initiate a timing operation. In addition, ground on conductor 402 completes a circuit over contact 4 of relay 604, contact 1 of relay 603 to battery through the winding of relay 606. Relay 606 operates in this circuit and closes obvious circuits for operating relays 607 and 608.

Relay 401 also closes a circuit from ground over contact 2 of relay 403, high and low resistance windings of relay 404, contact 5 of relay 401, conductor 417, through the sender link 111, to conductor 117, to battery through the winding of relay 121. The resistance in this circuit is so high as to prevent the operation of relay 121, but relay 404 operates, as an indication that the circuit is complete, and closes a circuit for operating relay 405. Relay 405, in operating, at its contact 1 connects ground to the left winding of relay 404 to take the place of the ground supplied over contact 2 of relay 403, and at its contact 2 closes an obvious circuit for relay 403. Relay 403 operates and locks under the control of relay 401.

Relay 405 also closes a circuit from ground over its contact 3, contact 3 of relay 401, conductor 418 through the sender link 111 to conductor 118 and battery through the winding of relay 106. Relay 106 operates in this circuit and locks over a circuit not shown. At its contacts 1 and 5 it disconnects relay 107 from the composite signaling conductor 104, and, at its contact 4, prepares for the control of relay 107 by a supervisory circuit to be extended to the distant office. At this time relay 107 is held operated over conductor 119 under the control of the designation registration circuit 423 in the sender.

In the meantime, conductors 113 to 116, extending to conductors 413 to 416, have been used to transfer class marks applied at the trunk circuit to the class register 409 in the sender. When the class registration has been completed, relay 421 is operated, connecting ground from contact 1 of relay 405 in shunt of the left, high resistance winding of relay 404, so that relay 121 can not operate.

With relay 121 operated, conductors 113 to 116 are disconnected from the class marks and are connected to conductors 133 to 136 leading to the incoming switch frame. The disconnection of the class marks causes the class registration circuit 409 to operate relay 408, disconnecting the class registration circuit 409 from the trunk.

The operation of relay 408 also causes the designation register 423 to disconnect ground from conductor 419, thereby permitting relay 107 to release. Relay 107, in releasing, disconnects battery from conductor 105 and again connects ground to that conductor, as a signal that the toll office sender is ready to receive the designation. The composite signaling circuit now functions to transmit dial type pulses over conductor 104, contact of relay 122, conductor 120 through the sender link 111 to conductor 420 and the designation register 423. The designation of the called subscriber is now registered in the designation register 423.

When three digits have been registered, relay 424 is operated, completing a circuit from ground, over the contact of relay 424, contact 3 of relay 425, to battery through the winding of the marker start relay 426. Relay 426 operates and locks over its contact 1 to off-normal ground. Relay 426 also closes a circuit from battery, through the winding of relay 427, contact 2 of relay 426, contact 2 of relay 404, conductor 428, contact 1 of relay 604, contact of relay 608 to ground on conductor 402.

Figure 7:
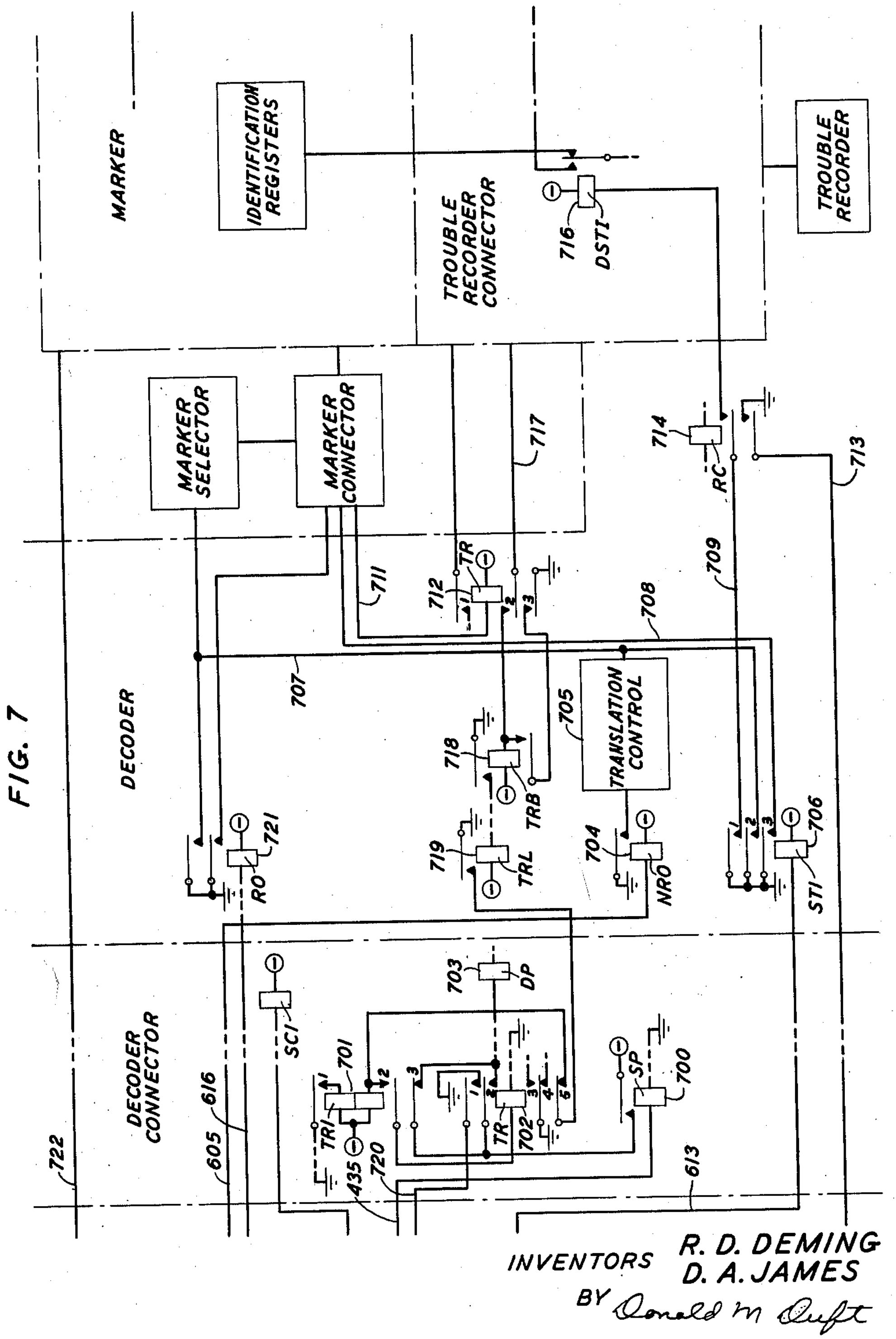
FIG. 7 shows parts of a decoder connector, a decoder, a marker, the trouble recorder connector and, in skeleton form the marker selector, the marker connector, and the trouble recorder.
Figure 8:
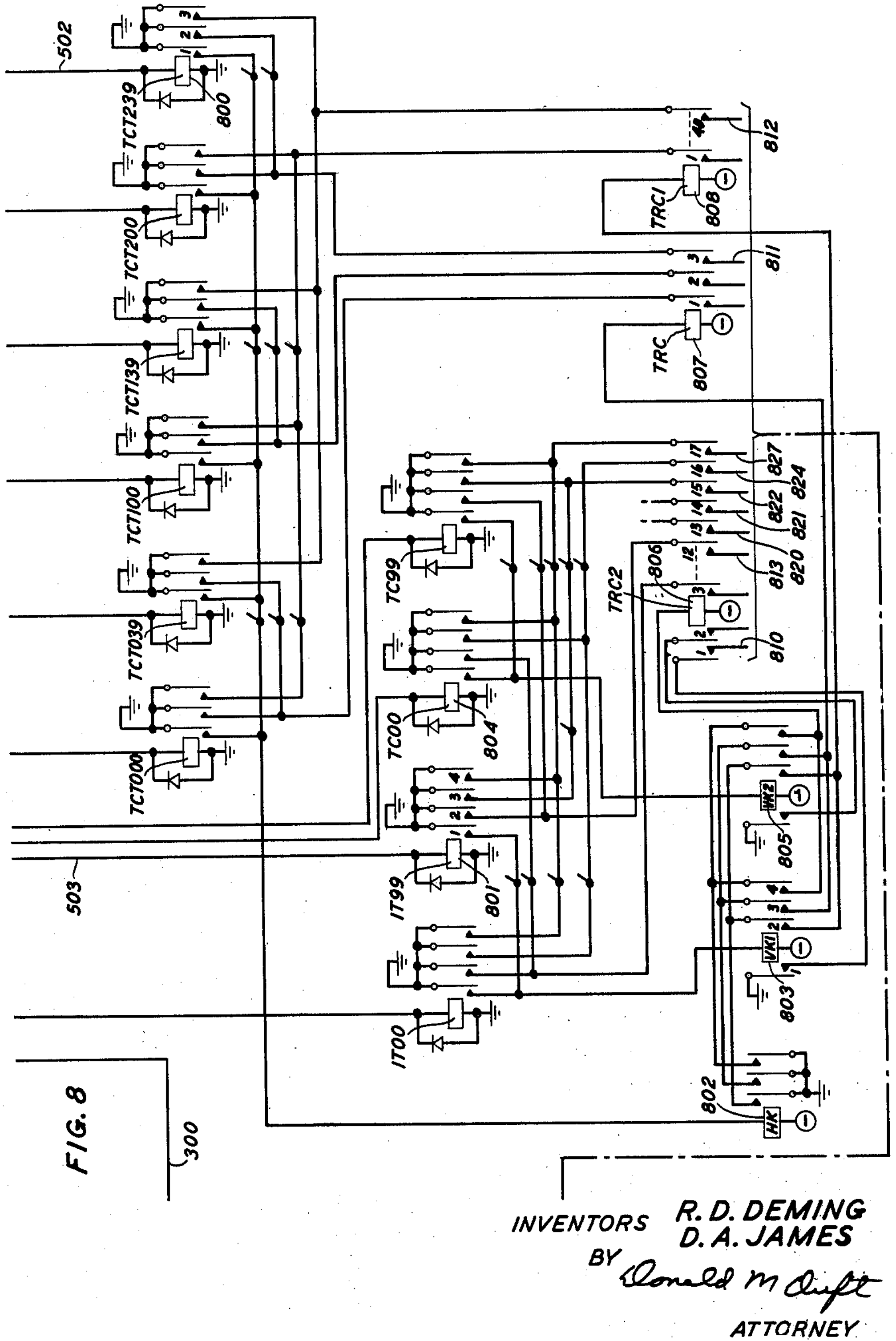
FIG. 8 shows the trunk identifier.

Relay 427 operates in this circuit and connects battery over its contact 2, conductor 429, contact 1 of relay 425, conductor 435 to the winding of the sender preference relay 700, individual to this sender in the decoder connector of FIG. 7. The circuit of relay 700 extends to ground through a preference circuit, whereby only one sender can control the decoder connector at a time. However, the connector frame has a plurality of channels so that more than one sender-decoder connection can exist simultaneously.

When relay 700 operates, it closes a circuit from battery over its contact, contact 3 of relay 701, through a decoder preference circuit to the winding of a relay 703 individual to the preferred decoder and thence to ground. With relays 700 and 703 operated, multicontact relays are operated whereby the sender is connected with the preferred decoder. With the decoder connector operated, a circuit is closed from ground, contact 10 of relay 602, contact 2 of relay 603, contact 2 of relay 604, conductor 605, through the decoder connector to battery through the winding of relay 704 in the decoder, to indicate to the decoder that a normal type of call is to be handled. Relay 704 initiates the operation of the translator control equipment 705 and the completion of the desired connection by the marker, as described in the above-identified Gooderham et al. patent.

Figure 3:
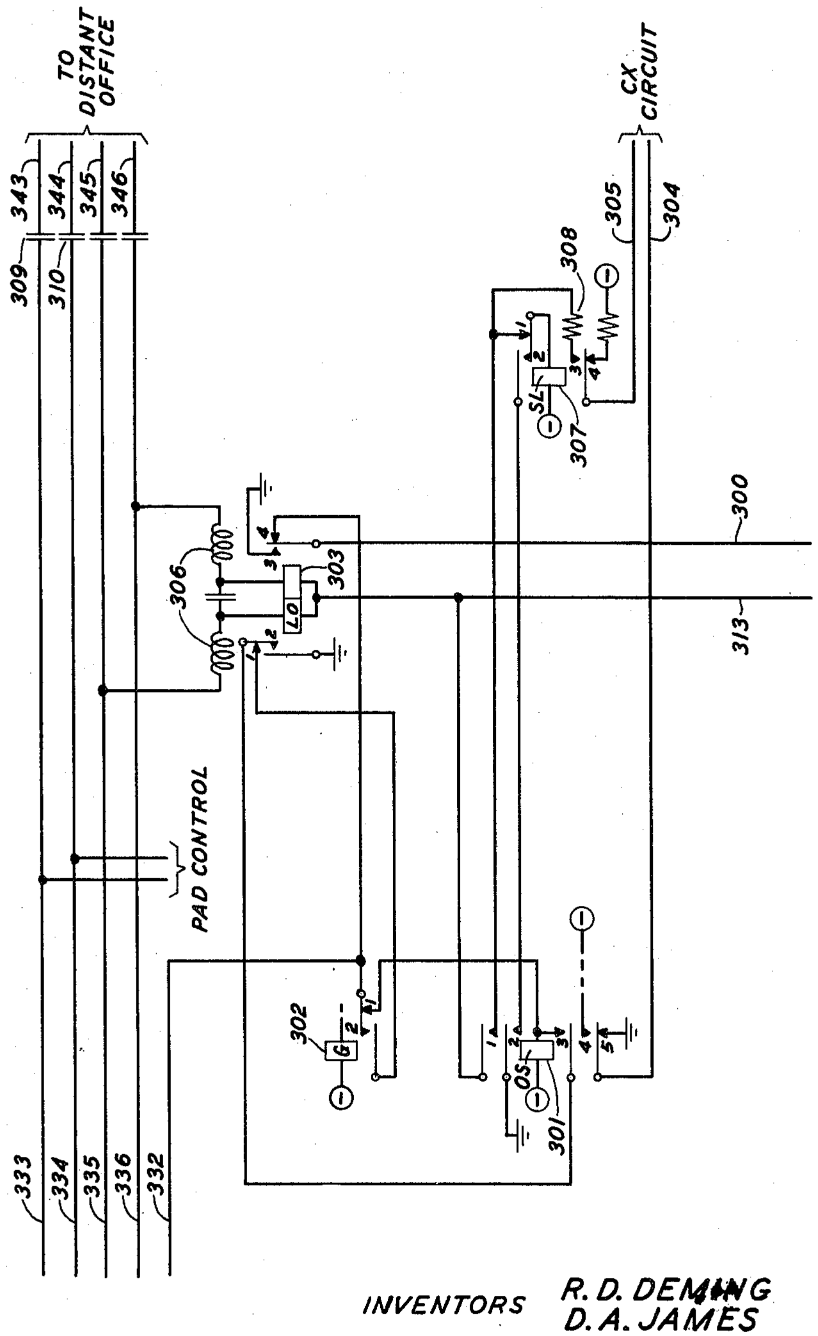
FIG. 3 shows an outgoing trunk circuit.

The marker receives from the translator an indication of the trunk block and trunk group required for completing the connection and tests for an idle trunk in the indicated block and group. An idle outgoing trunk, such as the trunk shown in FIG. 3, is identified by the connection of battery through the winding of relay 301, contact 1 of relay 302, contact 4 of relay 303 to conductor 309. Having selected the trunk of FIG. 3, the marker connects ground to conductor 300, operating relay 301. Relay 301 in turn operates relay 302, to prepare for a timed release, and locks to conductor 300 over its own contact 3, contact 1 of relay 303 and contact 2 of relay 302. Relay 301 at its contact 5 disconnects ground from conductor 304, leading to the composite signaling circuit associated with the outgoing trunk, and connects battery to that conductor to transmit a seizure signal to the distant office. The marker identifies the frames on which the incoming trunk and outgoing trunk are located and operates the proper frame switches to connect the two trunks together. When the connection has been completed and tested, the marker transmits a signal to the sender, in response to which the sender connects ground to conductor 412, completing a circuit, through the sender link 111, conductor 132, through the switch train to conductor 332, contact 2 of relay 302, contact 1 of relay 303, contact 3 of relay 301 to battery through the winding of relay 301, holding relay 301 operated. Ground on conductor 332 is extended over contact 4 of relay 303 to conductor 300 as a signal to the marker that the trunk is now being held busy by the sender.

The marker now connects ground, through the decoder connector to conductor 722, completing a circuit to battery through the winding of marker release relay 425. Relay 425 operates in this circuit and locks over contact 1 of relay 427 to ground at contact 2 of relay 425. At its contact 1 relay 425 opens the circuit of the sender preferance relay 700, thereby releasing the decoder connector and marker.

Following the release of the marker, the sender measures a time interval, after which a circuit is closed from ground, through the high resistance left winding of relay 430, and thence in parallel over contacts 2 and 4 of relay 408, contacts 1 and 3 of relay 407, contacts 1 and 3 of relay 406, conductors 415 and 416, through the sender link 111, conductors 115 and 116, contacts 4 and 8 of relay 121, conductors 135 and 136, through the switches of the intertoll switch train, conductors 335 and 336, windings of retard coil 306, windings of relay 303, contact 1 of relay 301, contact 1 and winding of relay 301 to battery. Relay 430 operates in this circuit, but, due to the high resistance of the winding of relay 430, relay 307 does not operate at this time.

With relay 430 operated, a circuit is completed for operating relay 431, which locks to off-normal ground. With relay 431 operated, ground is connected to the right low resistance winding of relay 430, in parallel with the high resistance winding of that relay, and relay 307 now operates, and locks over its contact 2 under the control of relay 301. At its contact 1, relay 307 opens its operating circuit and at its contact 3, extends that circuit through resistor 308 to conductor 305, leading to the composite signaling circuit.

If the distant office is not yet ready to receive pulses, ground will be connected to conductor 305, or, if that office is ready, the conductor will be open. In either case, relay 430 releases, closing a circuit from ground, over contact 2 of relay 430, contact 3 of relay 431, to battery through the winding of relay 407. Relay 407 disconnects the circuit above traced over conductors 415 and 416, from the windings of relay 430 and extends it to the supervisory test circuit 432, which responds to the removal of ground from conductor 305 to initiate the operation of the outpulsing circuits 433.

Outpulsing, in the form of multifrequency pulses, takes place over a circuit including conductors 413 and 414, through the sender link 111, conductors 113 and 114, contacts 2 and 6 of relay 121, conductors 133 and 134, through the intertoll switch train, conductors 333 and 334, through condensers 309 and 310 to conductors 343 and 344 leading to the distant office.

When outpulsing is completed, the circuit of relay 404 is opened and that relay releases, in turn releasing relay 405, relay 401 and relay 121 of the trunk circuit. The release of relay 405 brings about the complete release of the sender and the release of relay 401 removes ground from conductor 402 to terminate the timing operation.

The release of relay 121 connects conductors 100, 101, 102 and 103 to conductors 133, 134, 135 and 136, respectively, thereby completing the talking circuit through this toll switching center.

As above described, the operation of relay 401 initiates the operation of the timing circuit 600. This circuit is recycled at different stages of the operation of the sender as described in the above-identified Gooderham et al. patent, is ineffective while the sender is attached to a decoder or a marker, and is ordinarily restored to normal by the release of relay 401 as above indicated.

If, however, the timing cycle is completed, a circuit is completed for relay 603 which operates and locks over its contact 5 to ground on conductor 402. Relay 603, in operating, opens the circuit of relay 606 which releases slowly, in turn releasing relay 608 and relay 607, the latter relay also releasing slowly.

The effect of the operation of relay 603 varies according to the stage of sender operation at which it occurs. These operations are described in the above-identified patents to Gooderham et al. and Gorgas et al.

Since the present invention has to do with identifying the outgoing trunk, it will be assumed that the connection between the sender and the outgoing trunk has been set up as above outlined and that the marker and decoder have been released. Under this condition, the release of relay 608 opens the circuit of relay 427, causing that relay to release, in turn releasing relay 425.

Except under unusual circumstances, key 609 in the traffic control circuit will be closed, connecting ground to each sender for the purpose of causing a trouble record to be made whenever the sender times out. Therefore, when relay 603 is operated by the timing circuit 600 and during the release time of relay 607, a circuit will be closed from ground on conductor 610, contact 3 of relay 607, contact 6 of relay 603, contact 1 of relay 611, contact of relay 612, to battery through the winding of relay 602. Relay 612 is operated whenever a complete designation has been registered. Relay 602 operates in this circuit and closes a locking circuit for itself from battery, through its winding, over the contact of relay 612, contact 1 of relay 611 to ground at contact 5 of relay 602.

The operation of relay 602 results in the calling in of a decoder. As soon as relay 607 releases, closing its contact 1, relay 427 is reoperated in a circuit from battery through the winding of relay 427, contact 2 of relay 426, contact 2 of relay 404, conductor 428, contact 1 of relay 607 to ground on conductor 402. Relay 427 connects battery over its contact 2, conductor 429, contact 3 of relay 602 to conductor 435 and the winding of sender preference relay 700 to operate the decoder connector and connect the sender with an idle decoder.

Since relay 602 is operated, ground is connected to conductor 613 and, as soon as the decoder connector is operated, this ground is extended through the connector to battery through the winding of relay 706. Relay 706 operates to indicate that a trouble record is to be made. At its contact 2, relay 706 connects ground to conductor 707 to cause the marker selector to bring about the connection of an idle marker with the decoder. At its contact 3, relay 706 connects ground to conductor 708 leading to the marker connector to inform the marker that a trouble record is to be made.

The marker, in response to this indication, connects ground to conductor 711, operating relay 712 which, in turn, operates the trouble recorder connector, causing the trouble recorder to be connected with the decoder and the marker to record whatever information has been set up in these circuits. In addition, the trouble recorder operates connector relay 714 which grounds conductor 713, extending through the decoder connector to battery through the winding of connector relay 614 in the sender to close circuits for transmitting additional information from the sender to the trouble recorder.

When the trouble recorder has been connected with the decoder, as indicated by the operation of connector relay 714, relay 706, at its contact 1, connects ground over conductor 709, contacts of connector relay 714, to battery through the winding of relay 716 in the trouble recorder connector to prepare the trouble recorder for receiving the trunk identify from the trunk identifier. Relay 614, in operating, connects ground over contact 8 of relay 602, conductor 615 and through the winding of relay 406 to battery. Relay 406 operates in this circuit.

Relay 406, when operated, disconnects conductors 415 and 416 from the supervisory circuit 432 and connects +130 volt battery, through resistor 434, over contact 5 of relay 406 and contacts 4 and 2 of relay 406 in parallel to conductors 415 and 416. From conductors 415 and 416, the circuit extends as previously traced through the windings of relay 303 in the outgoing trunk circuit, and thence over conductor 313 to the trunk identifier.

It will be remembered that, as previously described, the windings of relay 303 are also connected to conductor 305 but, since this conductor is used for receiving signals which consist of either ground or an open circuit condition, the connection of positive battery to that conductor does not interfere with normal functions.

The trunk identifier comprises a rectangular matrix arrangement, including a pair of diodes at each crosspoint individual to a trunk to be identified. The inputs of the diodes are connected together to a conductor leading to the trunk to which the pair is individual. The outputs of each pair of diodes are connected one to a vertical multiple and one to a horizontal multiple, the multiples in turn terminating in the windings of identification relays. The diodes are so oriented that they permit the passage of the +130 volt potential toward the identification relays, but isolate the trunks from the ground connected to the identification relays.

For a fully equipped toll switching point, there may be a maximum of 12,000 intertoll trunks and a maximum of 12,000 toll completing trunks. In such an office, the identifier will have 120 horizontal multiples and 100 vertical multiples each for intertoll trunks and toll completing trunks.

As fully described in the above-identified Gooderham et al. patent, the marker selects a trunk by means of information transmitted thereto by the translator. This information includes the numbers of the trunk block connector (0–29) and of the trunk block relay (0–9) by which the marker may obtain access to the test conductors of the group of trunks to be tested. The trunk block connector number is made up of a tens digit (0–2) and a units digit (0–9). Having selected an idle trunk, the marker has a record of the position (0–39) of the trunk test lead in the trunk block relay. If the marker now encounters difficulty in completing the connection, for example in finding an idle channel, the marker calls in the trouble recorder and the trouble record will include the above identification of the outgoing trunk.

The trunk identifier is therefore arranged to identify the trunk in a similar manner. For convenience and economy in the number of relays required, the trunk test lead number and the tens digit of the trunk block connector number are combined to provide the 120 horizontal multiples while the trunk block relay number and the units digit of the trunk block connector number are combined to provide the 100 vertical multiples.

Specifically, the test lead 300 of the trunk circuit of FIG. 3 may be assumed to appear in position 39 on trunk block relay 9, which is associated with trunk block connector 29 and is an intertoll trunk. Therefore the identification lead 313 of that trunk will be connected to the crosspoint made up of diodes 500 and 501 located in the intertoll half of the identifier. Diode 500 is connected to horizontal multiple 502 which extends to ground through the winding of relay 800. Diode 51 is connected to vertical multiple 503 which extends to ground through the winding of relay 801.

When +130 volt battery is connected to identification conductor 313 as above described, relays 800 and 801 operate.

Horizontal multiple relay 800 operates horizontal check relay 802, which operates in response to the operation of any one of the horizontal multiple relays. Similarly, vertical multiple relay 801 operates vertical check relay 803. As previously mentioned, there are two sets of vertical multiples, one for intertoll trunks and one for toll completing trunks. Since the trunk of FIG. 3 is an intertoll trunk, it operates an intertoll multiple relay, in turn causing the operation of intertoll vertical check relay 803. In the case of a toll completing trunk one of the toll completing multiple relays, for example relay 804, would be operated and would operate toll completing check relay 805.

With check relays 802 and 803 operated, circuits are closed for the trouble recorder cut-in relays, namely, relays 806, 807 and 808. With relays 800 and 801 operated, the operation of relays 806, 807 and 808 extends ground to six conductors leading to the trouble recorder connector. Ground is connected over contact 1 of relay 803, contact 1 of relay 806 to conductor 810 to identify the trunk as an intertoll trunk. Ground is connected over contact 2 of relay 800 and contact 3 of relay 807 to conductor 811 to indicate that the trunk is associated with a trunk block connector having a tens digit 2. Relay 800 also closes a circuit from ground over its contact 3 and contact 40 of relay 808 to conductor 812 to indicate that the trunk occupies position 39 on its associated trunk block relay.

Relay 801 closes a circuit from ground over its contact 2 and contact 12 of relay 806 to conductor 813 to indicate that the units digit of the trunk block connector number is 9. Since the trunk block relay number is registered in the marker by means of a two out of five code, relay 801 supplies the trunk block relay number in the same code and therefore connects ground over its contacts 3 and 4 and contacts 15 and 17 of relay 806 to conductors 822 and 827, to indicate that the trunk block relay number is 9.

The trunk circuit of FIG. 3 has therefore been identified as an intertoll trunk located in position 39 on trunk block relay 9 associated with trunk block connector 29.

The trouble recorder normally receives such information from the marker, but when the trouble recorder connector is seized to record a stuck sender condition and relay 716 is operated, as previously described, relay 716 disconnects the recorder circuits from the marker and connects them to the trunk identifier.

When the record has been completed, ground is connected to conductor 717 which extends over contact 2 of relay 712 to battery through the winding of relay 718, operating the latter relay. Relay 718 locks under the control of relay 712 and operates trouble release relay 719. Relay 719, in operating, closes a circuit from ground over its contact, contact 5 of relay 702 in the decoder connector, lower winding of relay 701 to battery. Relay 701 operates, locks through its upper winding and extends its operating circuit over its contact 2 to ground through the winding of relay 702. At its contact 3, relay 701 opens the circuit of the decoder preference relay 703, causing the decoder connector and decoder to release. The release of the decoder connector releases relays 614 and 406 in the sender. Relay 405 released removes the +130 volt ground from the trunk which, in turn, restores the identifier to normal. The release of the decoder also releases relay 701. Relay 702 now operates in series with the lower winding of relay 701 and closes a new circuit for a decoder preference relay, such as relay 703. With relay 702 operated, ground is connected over its contact 1, conductor 720, contact 4 of relay 602 to battery through the winding of relay 611. Relay 611 operates and locks over its contact 2 to ground at contact 5 of relay 602 and then opens the operating circuit of relay 602, so that relay 602 releases, in turn releasing relay 611. With relay 603 operated, the release of relay 602 closes a circuit from ground over its contact 10, contact 3 of relay 603, conductor 616 through the decoder connector to battery through the winding of reorder relay 721 to cause the call to be routed to a reorder trunk and free the sender for another call.

What is claimed is:

1. In a telephone switching office, trunks incoming thereto, outgoing trunks extending therefrom to other offices, switches for connecting said incoming trunks to said outgoing trunks, common control equipment units, means for connecting any calling one of said incoming trunks with one of said equipment units, means in each of said equipment units for registering called office information transmitted over a calling trunk currently connected thereto, means responsive to said called office registration in any equipment unit for connecting said last-named equipment unit and the calling trunk currently connected thereto via said switches with an outgoing trunk leading to the called office signified by said registration, and means common to all of said outgoing trunks and automatically responsive to a trouble condition associated with any of said outgoing trunks currently serving a call for determining the identity of said outgoing trunk.

2. In a telephone switching office, trunks incoming to said office, outgoing trunks extending therefrom to other offices, trains of switches for connecting said incoming trunks to said outgoing trunks, senders, means for connecting any calling one of said incoming trunks with one of said senders, means in each of said senders for registering called office information transmitted over the calling trunk currently connected thereto, means including said trains of switches responsive to said registration by said registering means to connect said calling trunks and the senders currently connected thereto with the outgoing trunks leading to the called offices, a trouble recorder, and means common to all of said outgoing trunks and automatically responsive to a trouble condition associated with any outgoing trunk currently serving a call for causing said trouble recorder to produce a record manifesting the identity of said last-named outgoing trunk.

3. In a telephone switching office, trunks incoming to said office, outgoing trunks extending therefrom to other offices, a train of switches for connecting an incoming trunk to an outgoing trunk, an incoming sender, means for connecting a calling one of said incoming trunks with said sender, means in said sender for registering the identity of a called office transmitted over said calling incoming trunk, means under the control of said registering means for connecting said calling trunk and said sender through one of said outgoing trunks to said called office, trouble timing means in said sender, a trouble recorder, means under the control of said timing means for connecting said sender with said trouble recorder upon the unsuccessful completion of said connection through said outgoing trunk to said called office due to a trouble condition in said outgoing trunk, and means including said trouble timing means and said trouble recorder responsive to said trouble condition in the outgoing trunk to which said sender is currently connected for manifesting the identity of said outgoing trunk.

4. In a telephone switching office, trunks incoming to said office, outgoing trunks extending therefrom to other offices, a train of switches for connecting an incoming trunk to an outgoing trunk, an incoming sender, means for connecting a calling one of said incoming trunks with said sender, means in said sender for registering the identity of a called office transmitted over said calling incoming trunk, means under the control of said registering means for connecting said calling trunk and said sender through one of said outgoing trunks to said called office, trouble timing means in said sender, a trouble recorder, means under the control of said timing means for connecting said sender with said trouble recorder upon the unsuccessful completion of said connection through said outgoing trunk to said called office, means responsive to the connection of said sender with said trouble recorder to cause said sender to transmit a special test signal over said train of switches to said connected outgoing trunk, and means responsive to the transmission of said test signal for causing said trouble recorder to manifest the identity of said last-named outgoing trunk.

5. In a telephone switching office, trunks incoming to said office, outgoing trunks extending therefrom to other offices, a train of switches for connecting an incoming trunk to an outgoing trunk, an incoming sender, means for connecting a calling one of said incoming trunks with said sender, means in said sender for registering the identity of a called office transmitted over said calling incoming trunk, means under the control of said registering means for connecting said calling incoming trunk and said sender through one of said outgoing trunks to said called office, trouble timing means in said sender, a trouble recorder, means under the control of said timing means for connecting said sender with said trouble recorder upon the unsuccessful completion of said connection through said outgoing trunk to said called office, means responsive to the connection of said sender with said trouble recorder to cause said sender to transmit a special signal over said train of switches to said connected outgoing trunk, means common to all outgoing trunks responsive to said special signal for translating it into a trunk identity signal, means to transmit said trunk identity signal to said trouble recorder, and means including said trouble recorder responsive to said translation for manifesting the identity of said last-named outgoing trunk.

6. In a telephone switching office, trunks incoming to said office, outgoing trunks leading to other offices, trains of switches for connecting an incoming trunk to an outgoing trunk, an incoming sender, means for connecting one of said incoming trunks with said sender, means in said sender to register the identity of a wanted office transmitted over said incoming trunk, means under the control of said registering means to connect said incoming trunk and said sender with one of said outgoing trunks leading to said wanted office, trouble timing means in said sender, a trouble recorder, means under the control of said timing means to connect said sender with said trouble recorder, means responsive to the connection of said sender with said trouble recorder to cause said sender to transmit a special signal to said connected outgoing trunk, means common to all outgoing trunks to receive said special signal and translate it into a trunk identity signal, and means to transmit said trunk identity signal to said trouble recorder.

7. In a telephone switching office, trunks incoming to said office, outgoing trunks leading to other offices, trains of switches for connecting an incoming trunk to an outgoing trunk, an incoming sender, means for connecting one of said incoming trunks with said sender, means in said sender to register the identity of a called office transmitted over said incoming trunk, means under the control of said registering means to connect said incoming trunk and said sender with one of said outgoing trunks leading to said called office, trouble timing means in said sender, a trouble recorder, means under the control of said timing means to connect said sender with said trouble recorder, means responsive to the connection of said sender with said trouble recorder to cause said sender to transmit a special signal to said connected outgoing trunk, means comprising a rectangular matrix common to all outgoing trunks to receive said special signal and translate it into a trunk identity signal, and means to transmit said trunk identity signal to said trouble recorder.

8. In a telephone switching office, trunks incoming to said office, outgoing trunks leading to other offices, trains of switches for connecting an incoming trunk to an outgoing trunk, an incoming sender, means for connecting one of said incoming trunks with said sender, means in said sender to register the identity of a called office transmitted over said incoming trunk, means under the control of said registering means to connect said incoming trunk and said sender with one of said outgoing trunks leading to said called office, trouble timing means in said sender, a trouble recorder, means under the control of said timing means to connect said sender with said trouble recorder, a simplex supervisory circuit connecting said sender with said outgoing trunk, means responsive to the connection of said sender with said trouble recorder to cause said sender to transmit a special non-interfering signal over said simplex supervisory circuit to said connected outgoing trunk, means common to all outgoing trunks to receive said special signal and translate it into a trunk identity signal, and means to transmit said trunk identity signal to said trouble recorder.

9. In a telephone switching office, trunks incoming to said office, outgoing trunks leading to other offices, trains of switches for connecting an incoming trunk with an outgoing trunk, an incoming sender, means for connecting one of said incoming trunks with said sender, means in said sender to register the identity of a called office transmitted over an incoming trunk, a switch controlling marker, means under the control of said registering means to cause said marker to select an idle one of said outgoing trunks leading to the called office, means in said marker to register the identity of the selected trunk, to connect said selected trunk with said incoming trunk and said sender and then release, trouble timing means in said marker, a trouble recorder, means under the control of said marker timing means to connect said marker with said trouble recorder, means in said trouble recorder to record the identity of said selected outgoing trunk, trouble timing means in said sender, means under the control of said sender timing means to connect said sender with said trouble recorder, means responsive to the connection of said trouble recorder with said sender to cause said sender to transmit a special signal to said connected outgoing trunk, means common to all outgoing trunks to receive said special signal and translate it into a trunk identity signal and means to transmit said trunk identity signal to said trouble recorder.

10. In a telephone switching office, trunks incoming to said office, outgoing trunks leading to other offices, trains of switches for connecting an incoming trunk to an outgoing trunk, an incoming sender, means for connecting one of said incoming trunks with said sender, means in said sender to register the identity of a called office transmitted over said incoming trunk, a switch controlling marker, means under the control of said registering means to cause said marker to select an idle one of said outgoing trunks leading to the called office, means in said marker to register the identity of the selected trunk, to connect said selected trunk with said incoming trunk and said sender and then release, trouble timing means in said marker, a trouble recorder, means under the control of said marker timing means to connect said marker with said trouble recorder, means in said trouble recorder to record the identity of said selected outgoing trunk, trouble timing means in said sender, means under the control of said sender timing means to connect said sender with said trouble recorder, means responsive to the connection of said trouble recorder with said sender to cause said sender to transmit a special signal to said connected outgoing trunk, a trunk identification circuit common to all outgoing trunks, means in said trunk identification circuit to receive said special signal and translate it into a trunk identity signal, means to transmit said trunk identity signal to said trouble recorder and means responsive to the connection of a sender with said trouble recorder to disconnect said trunk identity recording means from said marker and render said trunk identity recording means responsive to said trunk identity signal from said trunk identification circuit.

11. In a telephone switching office, trunks incoming to said office, outgoing trunks leading to other offices, trains of switches for connecting an incoming trunk to an outgoing trunk, an incoming sender, means for connecting one of said incoming trunks with said sender, means in said sender to register the identity of a called office transmitted over said incoming trunk, a switch controlling marker, means under the control of said registering means to cause said marker to select an idle one of said outgoing trunks leading to the called office, means in said marker to register the identity of the selected trunk in the form of a plurality of items, to connect said selected trunk with said incoming trunk and said sender and then release, trouble timing means in said marker, a trouble recorder, means under the control of said marker timing means to connect said marker with said trouble recorder, means in said trouble recorder to record the plurality of items constituting the identity of said selected outgoing trunk, trouble timing means in said sender, means under the control of said sender timing means to connect said sender with said trouble recorder, means responsive to the connection of said sender with said trouble recorder to cause said sender to transmit a special signal to said connected outgoing trunk, a trunk identification circuit common to all outgoing trunks to receive said special signal and translate it into a trunk identity signal comprising a plurality of items, means to transmit said plurality of items to said trouble recorder, and means responsive to the connection of a sender with said trouble recorder to disconnect said trunk identity recording means from said marker and render said trunk identity recording means responsive to said plurality of items from said trunk identification circuit.

12. In a telephone switching office, trunks incoming to said office, outgoing trunks leading to other offices, trains of switches for connecting an incoming trunk to an outgoing trunk, an incoming sender, means for connecting one of said incoming trunks with said sender, means in said sender to register the identity of a called office transmitted over said incoming trunk, a switch controlling marker, means under the control of said registering means to cause said marker to select an idle one of said outgoing trunks leading to the called office, means in said marker to register the identity of the selected trunk in the form of a plurality of items, and to connect said selected trunk with said incoming trunk over said train of switches, means effective following the connection of said sender with said selected outgoing trunk to release said marker and wipe out said trunk identity registration, trouble timing means in said marker, a trouble recorder, means under the control of said marker timing means to connect said marker with said trouble recorder, means in said trouble recorder to the plurality of items constituting the identity of said selected outgoing trunk, trouble timing means in said sender, means under the control of said sender timing means following the release of said marker to connect said sender with said trouble recorder, means responsive to the connection of said sender with said trouble recorder to cause said sender to transmit a special signal to said connected outgoing trunk, a trunk identification circuit common to all outgoing trunks, means in said trunk identification circuit to receive said special signal and translate it into a trunk identity signal comprising a plurality of items, means to transmit said plurality of items to said trouble recorder, and means responsive to the connection of a sender with said trouble recorder to render said trunk identity recording means responsive to said plurality of items from said trunk identification circuit.

13. In a telephone switching office, trunks incoming to said office, outgoing trunks extending therefrom to other offices, senders, means for connecting any calling one of said incoming trunks with one of said senders, storage means in each of said senders for registering called office information transmitted over the calling trunk currently connected thereto, means responsive to said registration by said storage means to connect said calling trunks and the senders currently connected thereto with outgoing trunks leading to the called offices, trouble detection means in each of said senders operatively responsive to a trouble condition associated with the outgoing trunk currently connected thereto, a trouble recorder, and means for causing said trouble recorder to produce a record manifesting the identity of any outgoing trunk currently connected to a sender having operated trouble detection means.

References Cited in the file of this patent

UNITED STATES PATENTS 2,873,322 Vigren et al. ............ Feb. 10, 1959
2,878,328 Gohorel ............... Mar. 17, 1959